July 5, 1938.  R. L. CLAUSE  2,122,453
DOUBLE GLAZING UNIT
Filed May 26, 1936

INVENTOR.
ROBERT L. CLAUSE
BY
ATTORNEYS.

Patented July 5, 1938

2,122,453

UNITED STATES PATENT OFFICE 2,122,453

DOUBLE GLAZING UNIT

Robert L. Clause, Sewickley, Pa., assignor to Pittsburgh Plate Glass Company, Allegheny County, Pa., a corporation of Pennsylvania Application May 26, 1936, Serial No. 81,865

3 Claims. (Cl. 20—56.5)

Figure 1:
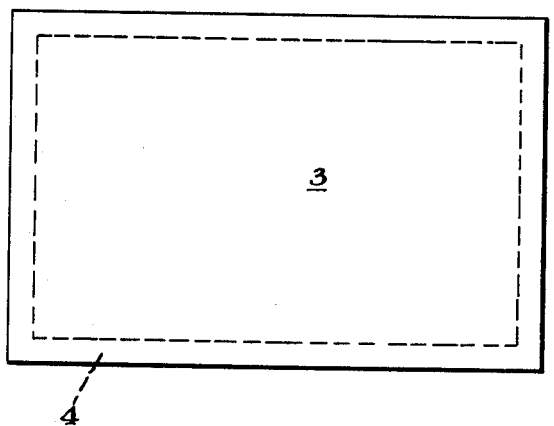
Figure 2:
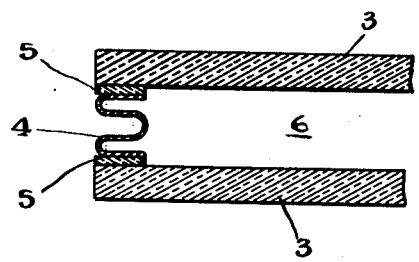

The invention relates to a double glazing unit and has for its principal objects the provision of an improved construction with sealing and spacing means which shall be completely impervious to the passage of moisture-bearing air from the atmosphere to the insulating space between the glass sheets. Heretofore difficulty has been experienced in providing a seal which would not, over a long period of time, prevent the infiltration of sufficient moisture to cause a clouding of the glass under varying temperature conditions, as materials heretofore used for spacing the sheets and sealing their edges which have the necessary elasticity have been subject to an inflow of air through the pores of the material. The present invention is designed to overcome these difficulties by the provision of a spacer of metal, preferably having a yielding characteristic, secured to the sheets by a vitreous bond, such material and bond both being completely impervious to the passage of air. One embodiment of the invention is shown in the accompanying drawing, wherein:

Figure 1 is a plan view of the unit. And Fig. 2 is an enlarged section, the thickness of the material of the spacer and of the bond being much exaggerated for clearness of illustration.

Referring to the drawing, 3, 3 are a pair of glass sheets, either of plate or window glass; 4 is a spacer of spring metal extending around the edges of the sheets as shown; and 5 is a vitreous sealing material which attaches the flanges of the spacer to the glass sheets. The spacer is preferably of non-porous metal having approximately the same coefficient of expansion as the glass, as otherwise there is a tendency to disrupt the bond when the unit is exposed to widely varying temperature conditions. A nickel steel having a nickel content between 40 and 50 per cent is suitable for this purpose, the exact composition being adjusted to suit the particular glass composition. A chromium steel alloy with a 25 to 35 per cent content of chromium may also be employed.

The vitreous sealing bond may be of a widely varying composition, the following formula being suitable:

|  | Parts |
|---|---|
| Lead oxide | 70 |
| Boric oxide | 12 |
| Alumina | 9 |
| Silica | 7 |
| Cobalt oxide | 2 |

In forming the unit, the parts are assembled with the frit which is to form the bond in suitable layers between the flanges of the spacer and the edge surfaces of the glass sheets. The unit is then heated to a temperature between 950° and 1000° F. to melt the frit and form the bond, such temperature being below that at which the upper glass sheet of the unit will soften and sag. The unit is then allowed to cool gradually. This operation may be carried out to advantage in a roller lehr or kiln, through which the units are carried, such lehr being heated to give a gradually increasing temperature to soften the frit, after which the temperature decreases gradually until the articles emerge from the lehr at handling temperatures. To take care of pressure changes in the space 6 which would tend to collapse the sheets, if a complete seal where made while the air was at a high temperature, provision is made for insuring communication of the space 6 with the outer air after the seal is made. This is accomplished by the provision of a perforation through the spacer which is subsequently sealed with a suitable solder.

What I claim is:

1. A double glazing unit comprising a pair of parallel glass sheets, a spacer of bent sheet metal with parallel flanges between the units at their edges having a coefficient of expansion approximately the same as that of the glass and a vitreous bond between the faces of the spacer and the surfaces of the glass sheets which will soften at a temperature substantially below the softening temperature of the glass sheets.

2. A double glazing unit comprising a pair of parallel glass sheets, a spring spacer of bent sheet metal with parallel flanges between the units at their edges having a coefficient of expansion approximately the same as that of the glass and a vitreous bond between the faces of the spacer and the surfaces of the glass sheets which will soften at a temperature substantially below the softening temperature of the glass sheets.

3. A double glazing unit comprising a pair of parallel glass sheets, a spacer of corrugated sheet metal with parallel flanges between the units at their edges having a coefficient of expansion approximately the same as that of the glass and a vitreous bond between the faces of the spacer and the surfaces of the glass sheets which will soften at a temperature substantially below the softening temperature of the glass sheets.

R. L. CLAUSE.